(12) United States Patent
Miller et al.

(10) Patent No.: US 6,946,012 B1
(45) Date of Patent: Sep. 20, 2005

(54) FILTER AND FORMING SYSTEM

(75) Inventors: Robert K. Miller, Indianapolis, IN (US); Z. Gerald Liu, Madison, WI (US); William C. Haberkamp, Cookeville, TN (US); Barry M. Verdegan, Stoughton, WI (US); Murray R. Schukar, Fitchburg, WI (US); A. Caner Demirdogen, Cookeville, TN (US)

(73) Assignee: FleetGuard, Inc., Nashville, TN (US)

( * ) Notice: Subject to any disclaimer, the term of this patent is extended or adjusted under 35 U.S.C. 154(b) by 76 days.

(21) Appl. No.: 10/442,516

(22) Filed: May 21, 2003

Related U.S. Application Data

(63) Continuation-in-part of application No. 09/935,847, filed on Aug. 23, 2001, now Pat. No. 6,582,490, which is a continuation-in-part of application No. 09/573,747, filed on May 18, 2000, now Pat. No. 6,444,006.

(51) Int. Cl.$^7$ .......................... B01D 46/52; B31F 1/22
(52) U.S. Cl. ..................... 55/521; 55/DIG. 5; 156/205; 156/474; 425/369
(58) Field of Search ........................... 55/521, DIG. 5; 125/205, 474; 425/369

(56) References Cited

U.S. PATENT DOCUMENTS

| | | |
|---|---|---|
| 1,924,472 A | 8/1933 | Thomson |
| 2,553,054 A | 5/1951 | Lincoln et al. |
| 3,025,963 A * | 3/1962 | Bauer ...................... 210/493.4 |
| 3,112,184 A | 11/1963 | Hollenbach |
| 3,966,646 A | 6/1976 | Noakes et al. |
| 4,017,347 A | 4/1977 | Cleveland |
| 4,028,252 A | 6/1977 | Morris |
| 4,398,931 A | 8/1983 | Shevlin |
| 4,410,427 A | 10/1983 | Wydeven |
| 4,430,223 A | 2/1984 | Miyakawa et al. |
| 4,617,072 A | 10/1986 | Merz |
| 4,652,286 A | 3/1987 | Kusuda et al. |
| 5,042,249 A | 8/1991 | Erdmannsdoerfer |
| 5,075,160 A | 12/1991 | Stinton et al. |
| 5,194,078 A | 3/1993 | Yonemura et al. |
| 5,196,120 A | 3/1993 | White |
| 5,207,807 A | 5/1993 | Manfre et al. |
| 5,250,476 A | 10/1993 | Mogensen et al. |
| 5,298,046 A | 3/1994 | Peisert |
| 5,322,537 A | 6/1994 | Nakamura et al. |
| 5,376,218 A | 12/1994 | Mito et al. |
| 5,456,069 A | 10/1995 | Haerle |
| 5,562,825 A | 10/1996 | Yamada et al. |

(Continued)

FOREIGN PATENT DOCUMENTS

EP     1155723     11/2001

(Continued)

OTHER PUBLICATIONS

*Monolithic Metal Oxide Thin-Wall Substrates with Closed and Open Cells: Optimal Designs by Theoretical Modeling and Experimental*, Eugene Shustorovich, Victor Shustorovich, Konstantin Sointsev, SAE 2001 World Congress, Mar. 5-8, 2001.

*Primary Examiner*—Robert A. Hopkins
(74) *Attorney, Agent, or Firm*—Andrus, Sceales, Starke & Sawall, LLP

(57) ABSTRACT

A filter includes first and second sheets of filter media, the second sheet being pleated and forming with the first sheet a plurality of axially extending flow channels having lateral cross-sectional shapes with two adjacent included angles each greater than 45° and less than 75°. Forming apparatus and methods are provided.

7 Claims, 3 Drawing Sheets

U.S. PATENT DOCUMENTS

| | | |
|---|---|---|
| 5,567,536 A | 10/1996 | Lintz et al. |
| 5,611,832 A | 3/1997 | Suzuki et al. |
| 5,876,537 A | 3/1999 | Hill et al. |
| 5,895,574 A | 4/1999 | Friedmann et al. |
| 5,908,480 A | 6/1999 | Ban et al. |
| 6,238,561 B1 | 5/2001 | Liu et al. |
| 2002/0090314 A1 | 7/2002 | Bedeau et al. |

FOREIGN PATENT DOCUMENTS

| | | |
|---|---|---|
| EP | 1260683 | 11/2002 |
| WO | WO 02/49741 A1 | 6/2002 |

* cited by examiner

FILTER AND FORMING SYSTEM

CROSS-REFERENCE TO RELATED APPLICATIONS

This application is a continuation-in-part of U.S. patent application Ser. No. 09/935,847, filed Aug. 23, 2001, now U.S. Pat. No. 6,582,490 which is a continuation-in-part of U.S. patent application No. 09/573,747, filed May 18, 2000, now U.S. Pat. No. 6,444,006, both incorporated herein by reference.

BACKGROUND AND SUMMARY

The invention relates to filters for filtering fluid, including air, exhaust, liquid, and other fluids, and to forming apparatus and methods for such filters.

The filter is formed by alternating layers of flat and pleated filter media. In one embodiment, the layers are rolled into a cylindrical or other closed loop shape, such as oval, racetrack shaped, etc. The channels formed by the intersection of the rolled pleated and flat layers run in an axial direction to the cylindrical structure along its length. Lower restriction and greater structural strength is provided, including crush strength, which is desirable for packaging and sleeving where appropriate. Particular geometries have been found to improve performance.

The invention further provides forming apparatus for the filter and methods of configuring and shaping same. In various applications, it may be desirable that the filter use pleated media with either triangular or trapezoidal cross-sections, rather than corrugated media with a sinusoidal shaped cross-section. The difference is significant for greater strength, stability, and structural integrity. This is particularly desirable in applications where force is applied in a radial direction to seal and hold the filter element in place, including in applications where the pleat height is less than 10 mm, and preferably less than 6 mm.

Conventional methods, including score-roll pleating and corrugation, cannot produce media with the noted desired geometry and structure. Pleating is commonly done by score-rolling, wherein the media passes between two rollers with male and female spikes and slots that score the media. The media then passes through downstream gathering wheels that feed the media against an opposing force. The inherent stiffness of the media causes the media to fold or crease into pleats along the score lines. For this reason, score-roll pleating is unsuitable for pliable media with insufficient stiffness. Another limitation is that desired small pleat heights in certain applications, e.g. less than 10 mm, cannot be obtained by the score-roll pleating method. Furthermore, creasing along the noted score lines can damage the media pleat tips for some types of filter media.

Another possibility is to use corrugation for producing a filter. In this method, corrugated rollers are used to imprint a shape onto the media, instead of creasing and folding the media as is done with other pleating methods. The limitation of the noted corrugation method is that the pleats have a sinusoidal cross-section, rather than triangular or trapezoidal. As above noted, triangular or trapezoidal flutes or channels are desired, with cross-sectional geometries which are more structurally stable and provide for more laminar flow.

In one aspect of the invention, a star gear pleating method is used to produce the pleated media filter. Particularly designed interlocking gears pass the media between one or more sharp tips of a gear tooth on one gear and a particularly formed root of the opposing gear. The teeth can be modified to provide triangular or trapezoidal pleats. The gears fold and gather the media without crushing it and without adversely affecting the performance of the filter. As the media is released from the interlocking gears, it is directed forward and out of the gears by guide bars which prevent the media from tending to follow the gears and become damaged. The present method does not rely on media stiffness to fold and crease the media, and hence it can be used on more pliable media without damage to the pleat tips. The media is partially gathered and folded between the interlocking teeth of the gears, which partial gathering helps prevent unwanted jams or reverse pleating otherwise common with score-roll pleating. The present method and forming apparatus allows much shorter pleat heights and faster pleating without damaging the media or breaking media fibers. In contrast to corrugation, the present technique provides straight sided triangular or trapezoidal pleats.

DETAILED DESCRIPTION

Figure 1:
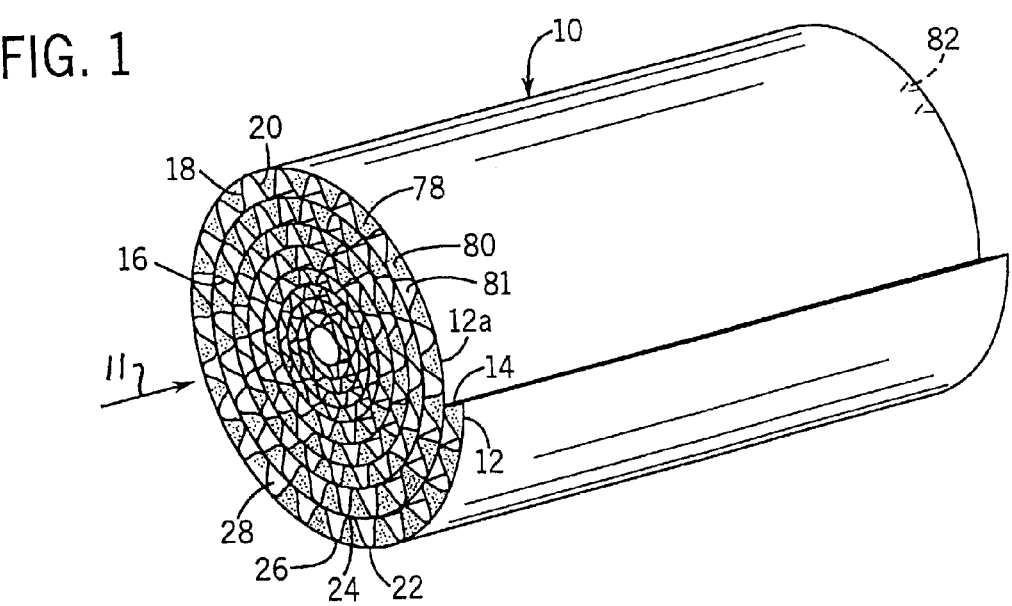
FIG. 1 is a perspective view of a filter in accordance with the invention.

FIG. 1 shows a filter 10 for filtering fluid flowing axially thereinto as shown at arrow 11. The filter includes first and second filter media sheets 12 and 14. Sheet 14 has a plurality of pleats such as 16 defined by wall segments 18, 20, etc. extending in zig-zag manner between pleat tips 22, 24, 26, etc., FIGS. 1, 2, at axially extending bend lines. The pleat tips such as 22 and 26 on one side of sheet 14 are in contiguous relation with sheet 12 and preferably bonded thereto with an adhesive or other binder, and define axial flow channels such as 28. Sheets 12 and 14 are preferably, though not necessarily, wound or rolled into a spiral, FIG. 1. In a spiral-wound or other multilayer stack, the pleat tips such as 24 on the other side of sheet 14 engage sheet 12 of the next layer, for example as shown at 12a, FIG. 2.

The noted flow channels such as 28 have a lateral cross-sectional shape having two adjacent included angles each greater than 45° and less than 75°. In one embodiment, sheets 12 and 14, including wall segments 18 and 20, have a thickness less than 0.8 mm, a porosity greater than 80%, and an extension b between pleat tips less than 10 mm. In the preferred form of such embodiment, the noted thickness is less than 0.5 mm, the noted porosity is greater than 85%, and the noted extension or length b is less than 6 mm.

Figure 2:
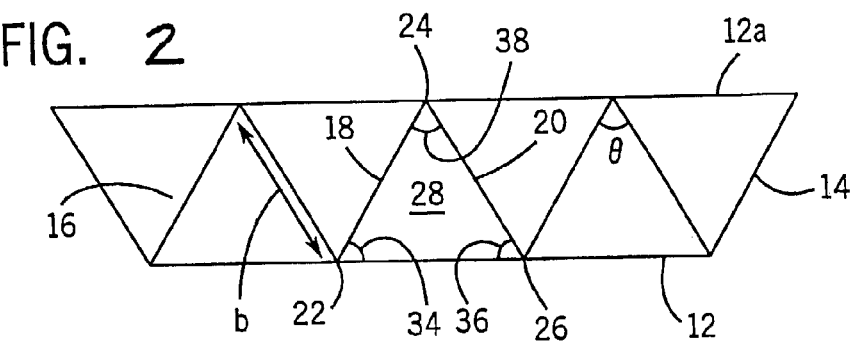
FIG. 2 is an enlarged cross-sectional view of a portion of FIG. 1.
Figure 3:
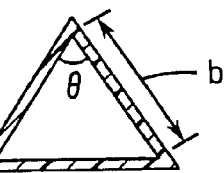
FIG. 3 is a view of a portion of FIG. 2 and includes wall dimension thickness.

The noted two adjacent included angles are provided by a first angle 34, FIG. 2, between first sheet 12 and wall segment 18 of second sheet 14, and a second angle 36 between first sheet 12 and second wall segment 20 of second sheet 14. As noted above, each of angles 34 and 36 is greater than 45° and less than 75°. In the embodiment of FIG. 2, the noted lateral cross-sectional shape of flow channel 28 consists of three pleat tips 22, 24, 26 and three included angles 34, 36, 38. Third angle 38 is between first and second wall segments 18 and 20. In preferred form, the lateral cross-sectional shape of flow channel 28 is an isosceles triangle wherein $$45° < \theta < 75°$$

$$0.5 \text{ mm} < \frac{2b \cdot \sin\frac{1}{2}\theta \cdot \cos\frac{1}{2}\theta}{1 + \sin\frac{1}{2}\theta} < 2.9 \text{ mm}$$

where θ is angle 38 between wall segments 18 and 20, and b is the noted extension or length of each of wall segment 20 between pleat tips 26 and 24 and wall segment 18 between pleat tips 22 and 24, as measured along the inside dimension of the wall, FIGS. 2, 3.

Figure 4:
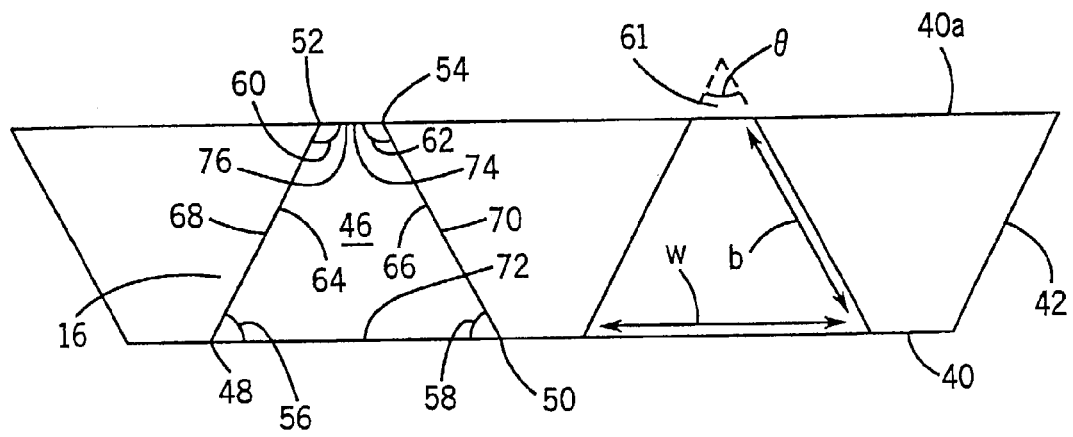
FIG. 4 is like FIG. 2 and shows an alternate embodiment.

FIG. 4 shows an alternate embodiment and uses like reference numerals from above where appropriate to facilitate understanding. In FIG. 4, the lateral cross-sectional shape of flow channels such as 46 consists of four pleat tips 48, 50, 52, 54 and four included angles 56, 58, 60, 62. Each of first and second angles 56 and 58 is greater than 45° and less than 75°. Each of third and fourth angles 60 and 62 is greater than 90°. The lateral cross-sectional shape is a trapezoid having first and second distally opposite sides 64 and 66 provided by wall segments 68 and 70 of pleats 20 and slanted towards each other. The trapezoid has distally opposite substantially parallel major and minor bases 72 and 74 extending laterally between sides 64 and 66. Major base 72 is longer than minor base 74. Wall segment 68 of second sheet 42 provides side 64 of the trapezoid. Wall segment 70 of second sheet 42 provides side 66 of the trapezoid. First sheet 40 provides major base 72 of the trapezoid. Second sheet 42 has a truncated wall segment 76 spanning first and second wall segments 68 and 70 and providing minor base 74 of the trapezoid. The ratio of the length of minor base 74 to the length of major base 72 is less than 0.27.

The flow channel lateral cross-sectional trapezoid shape of FIG. 4 consists of four walls, namely a first wall provided by first sheet 40 along major base 72, a second wall provided by first wall segment 68 of second sheet 42 along first side 64, a third wall provided by truncated wall segment 76 of second sheet 42 along minor base 74 and by a section of the next layer 18 of the first sheet at 40a in the spiral pattern along minor base 74, and a fourth wall provided by the second wall segment 70 of second sheet 42 along the noted second side 66. The noted first, second and fourth walls 72, 64, 66 have a single sheet thickness. The noted third wall at 74 has a double sheet thickness. The single sheet thickness of the first wall at 72 provided by first sheet 40 is less than 0.8 mm. The single sheet thickness of the second wall 64 provided by second sheet 42 at wall segment 68 is less than 0.8 mm. The double sheet thickness of the third wall 74 provided by first and second sheets 40 and 42 at 40a and 76 is less than 1.6 mm. The single sheet thickness of the fourth wall 66 provided by second sheet 42 at wall segment 70 is less than 0.8 mm. Walls 72 and 64 meet at pleat tip 48 and define angle 56. Walls 64 and 74 meet at pleat tip 52 and define angle 60. Walls 74 and 66 meet at pleat tip 54 and define angle 62. Walls 66 and 72 meet at pleat tip 50 and define angle 58. The length or height of wall 64 along wall segment 68 between pleat tips 48 and 52 is less than 10 mm, and preferably less than 6 mm. The length of wall 66 along wall segment 70 between pleat tips 50 and 54 is less than 10 mm, and preferably less than 6 mm.

Figure 5:
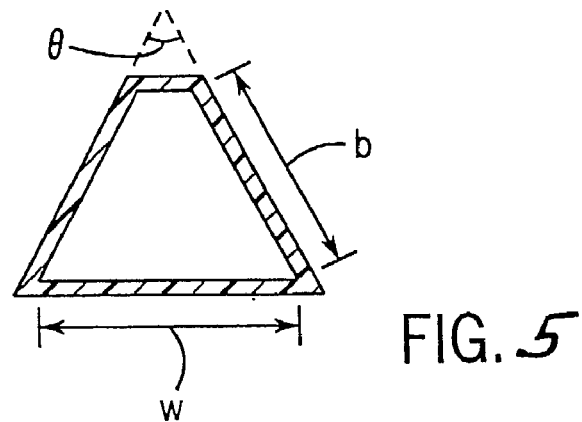
FIG. 5 is a view of a portion of FIG. 4 and includes wall dimension thickness.

In the preferred form of the embodiment of FIG. 3, $$45° < \theta < 75°,$$

$$0.5 \text{ mm} < \frac{2b \cdot \left(w - b \cdot \sin\frac{1}{2}\theta\right) \cdot \cos\frac{1}{2}\theta}{b + w - b \cdot \sin\frac{1}{2}\theta} < 2.9 \text{ mm}$$

where θ is the included angle at the intersection of projections of wall segments 68 and 70, b is the length of each of trapezoid sides 64 and 66 as measured along the inside dimension, FIGS. 4, 5, and w is the length of major base 72 as measured along the inside dimension, FIGS. 4, 5.

In one embodiment the noted wall segments are alternately sealed to each other by a first upstream set of plugs such as 78, FIG. 1, to define a first set of flow channels 80 closed by plugs 78, and a second set of flow channels 81 interdigitated with first set of flow channels 80 and having open upstream ends. The wall segments are alternately sealed to each other by a second downstream set of plugs such as shown in dashed line at 82, and as is known, closing the second set of flow channels 81. The first set of flow channels 80 have open downstream ends. This forces the flow from intake 11 to flow through the wall segments of the media, i.e. to flow into the open upstream ends of flow channels 81, and then cross through the filter media wall segments, and then flow through the open downstream ends of flow channels 80.

Figure 6:
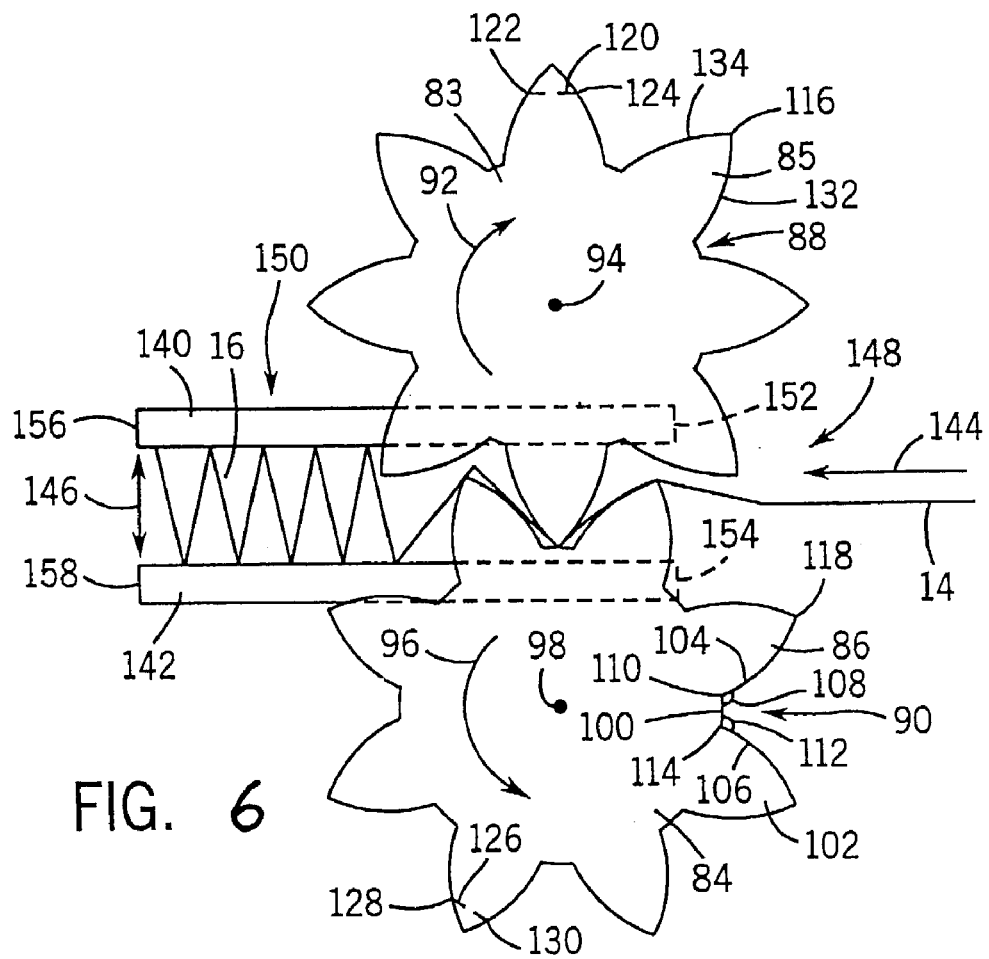
FIG. 6 is a side view showing forming apparatus in accordance with the invention.

FIG. 6 illustrates forming apparatus for the above noted filter. First and second star gears 83 and 84 each have a plurality of teeth 85 and 86 interdigitated with a plurality of roots 88 and 90 therebetween. The gears rotate in intermeshed relation with the tooth of one gear in the root of the other. Gear 83 rotates clockwise as shown at arrow 92 about rotation axis 94. Gear 84 rotates counterclockwise as shown at arrow 96 about rotation axis 98. Gears 83 and 84 pass second sheet 42 therebetween, and gather and fold second sheet 42 along crease lines at pleat tips 26, 28, 30, etc., which crease lines provide the noted axially extending bend lines. Each root such as 90 has a given arcuate length along an inner hub surface 100 spanning between and separating a respective pair of teeth such as 86 and 102 having sides 104 and 106 extending generally radially outwardly from opposite arcuate ends of spanning root hub surface 100. Side 104 meets spanning root hub surface 100 at a first angle 108 at a first junction point 110. Side 106 meets spanning root hub surface 100 at the second arcuate end thereof at a second angle 112 at a second junction point 114. First and second junction points 110 and 114 are spaced from each other by the noted given arcuate length of spanning root hub surface 100. Each of angles 108 and 112 is greater than 90°.

Each tooth of at least one of the gears has an outer end with a pointed tip 116 extending into a respective root and spaced from first junction point 110 by a first triangular shaped gap, and spaced from second junction point 114 by a second triangular shaped gap. In one preferred embodiment, the teeth of each of the gears have pointed tips 116 and 118 at the outer ends of the teeth. In another embodiment, each tooth of at least one of the gears has an outer end which is truncated as shown in dashed line at 120, to have first and second pointed tips 122 and 124 extending into a respective root. In a further embodiment, the teeth of the other gear may also be truncated as shown at dashed line 126, with first and second pointed tips 128 and 130 extending into a respective root.

The noted given arcuate length of spanning root hub surface 100 defines minor base 74. Sides 104 and 106 of the teeth diverge from each other as they extend radially outwardly from spanning root hub surface 100 and are spaced from each other at their outer ends along a second given arcuate length defining major base 72. In preferred form, the sides of the teeth, for example sides 132 and 134 of tooth 85, bow convexly as they extend from the outer end of the tooth generally radially inwardly to respective roots spaced on opposite sides of the tooth.

A pair of parallel guide bars 140 and 142 are spaced on opposite sides of the intermeshing of gears 83 and 84. Bars 140 and 142 extend parallel to the direction of travel 144 of second sheet 42 through the gears. The bars are spaced from each other by a gap 146 less than 10 mm along a direction perpendicular to travel direction 144 and perpendicular to the gear rotation axes 94, 98. The bars receive pleats 20 and engage pleat tips 26, 28, 30, etc. Sheet 42 is fed forwardly, leftwardly in FIG. 6, through the gears from an inlet region 148 to an outlet region 150. The guide bars have respective upstream ends 152, 154 at the gears, and downstream ends 156 and 158 at outlet region 150 and spaced leftwardly from the gears. It is preferred that upstream ends 152 and 154 of the guide bars be upstream of rotation axes 94 and 98, i.e. rightwardly of the rotation axes in FIG. 6. In the orientation of FIG. 6, the guide bars are spaced behind the gears, as illustrated in dashed line. The forming apparatus provides the preferred method of configuring and shaping the noted filter. In spiral wound configurations, the noted cross-sectional specifications of the channels are not met in the first several layers of pleats starting at the center.

In one embodiment in accordance with the noted parent application, the filter is initially a pre-form which is cured and rigidized, as in the noted parent patent, to an exhaust aftertreatment filter for filtering engine exhaust from an engine such as shown in U.S. Pat. No. 6,444,006 in FIG. 1 at diesel engine 30 receiving engine exhaust flowing axially therethrough at 32. The cured and rigidized filter is regenerable by heat to burn-off contaminant particulate collected from the engine exhaust. The pre-form may be rigidized with sol-gel, chemical vapor infiltration, ceramic bond phase, silicon carbide, or in other suitable manner.

It is recognized that various equivalents, alternatives and modifications are possible within the scope of the appended claims. For example, spiral wound, annular, concentric, and so on, include shapes such as cylindrical, oval, racetrack shaped, and the like. The filter and forming system hereof may be used for various filters for filtering fluid, including air, exhaust, liquid, and other fluids.

What is claimed is:

1. Forming apparatus for forming a filter, said filter comprising first and second sheets of filter media, said second sheet having a plurality of pleats defined by wall segments extending in zig-zag manner between pleat tips at axially extending bend lines, the pleat tips on one side of said second sheet being in contiguous relation with said first sheet and defining axial flow channels, said flow channels having a lateral cross-sectional shape comprising two adjacent included angles each greater than 45° and less than 75°, said forming apparatus comprising first and second star gears each having a plurality of teeth interdigitated with a plurality of roots therebetween, said gears rotating in intermeshed relation with the tooth of one gear in the root of the other gear, said gears passing said second sheet therebetween, said gears gathering and folding said second sheet along crease lines at said pleat tips, said crease lines providing said axially extending bend lines, wherein each said tooth has an outer end and a pair of convexly bowed sides extending from said outer end generally radially inwardly to respective roots spaced on opposite sides of the tooth.

2. Forming apparatus for forming a filter, said filter comprising first and second sheets of filter media, said second sheet having a plurality of pleats defined by wall segments extending in zig-zag manner between pleat tips at axially extending bend lines, the pleat tips on one side of said second sheet being in contiguous relation with said first sheet and defining axial flow channels, said flow channels having a lateral cross-sectional shape comprising two adjacent included angles each greater than 45° and less than 75°, said forming apparatus comprising first and second star gears each having a plurality of teeth interdigitated with a plurality of roots therebetween, said gears rotating in intermeshed relation with the tooth of one gear in the root of the other gear, said gears passing said second sheet therebetween, said gears gathering and folding said second sheet along crease lines at said pleat tips, said crease lines providing said axially extending bend lines, and comprising a pair of parallel guide bars spaced on opposite sides of the intermeshing of said gears, said bars extending parallel to the direction of travel of said second sheet through said gears, said bars being spaced from each other by a gap less than 10 mm along a direction perpendicular to said travel direction and perpendicular to the gear rotation axis, said bars receiving said pleats and engaging said pleat tips.

3. The forming apparatus according to claim 2 wherein said second sheet is fed forwardly through said gears from an inlet region to an outlet region, said guide bars have upstream ends at said gears, and downstream ends at said outlet region and spaced from said gears.

4. The forming apparatus according to claim 3 wherein said gears rotate about respective rotation axes, and said upstream ends of said guide bars are upstream of said rotation axes.

5. A method of configuring and shaping a filter, said filter comprising first and second sheets of filter material, said second sheet having a plurality of pleats defined by wall segments extending in zig-zag manner between pleat tips at axially extending bend lines, the pleat tips on one side of said second sheet being in contiguous relation with said first sheet and defining axial flow channels, said flow channels having a lateral cross-sectional shape comprising two adjacent included angles each greater than 45° and less than 75°, said method comprising feeding said second sheet through first and second star gears each having a plurality of teeth interdigitated with a plurality of roots therebetween, rotating said gears in intermeshed relation with the tooth of one gear in the root of the other gear, gathering and folding said second sheet through said gears along crease lines at said pleat tips, said crease lines providing said axially extending bend lines, and comprising feeding said second sheet through said gears to a pair of guide bars, spacing said guide bars on opposite sides of the intermeshing of said gears.

6. The method according to claim 5 comprising extending said guide bars parallel to the direction of travel of said second sheet through said gears, spacing said guide bars from each other by a gap less than 10 mm along a direction perpendicular to said travel direction and perpendicular to the gear rotation axis, and receiving said pleats and engaging said pleat tips with said guide bars.

7. The method according to claim 6 comprising feeding said second sheet forwardly through said gears from an inlet region to an outlet region, providing said guide bars with upstream ends at said gears, and downstream ends at said outlet region and spaced from said gears.

* * * * *